G. R. COOK.
PLOW AND CULTIVATOR CONVERTING ATTACHMENT.
APPLICATION FILED OCT. 27, 1919.
1,348,782.
Patented Aug. 3, 1920.
2 SHEETS—SHEET 1.
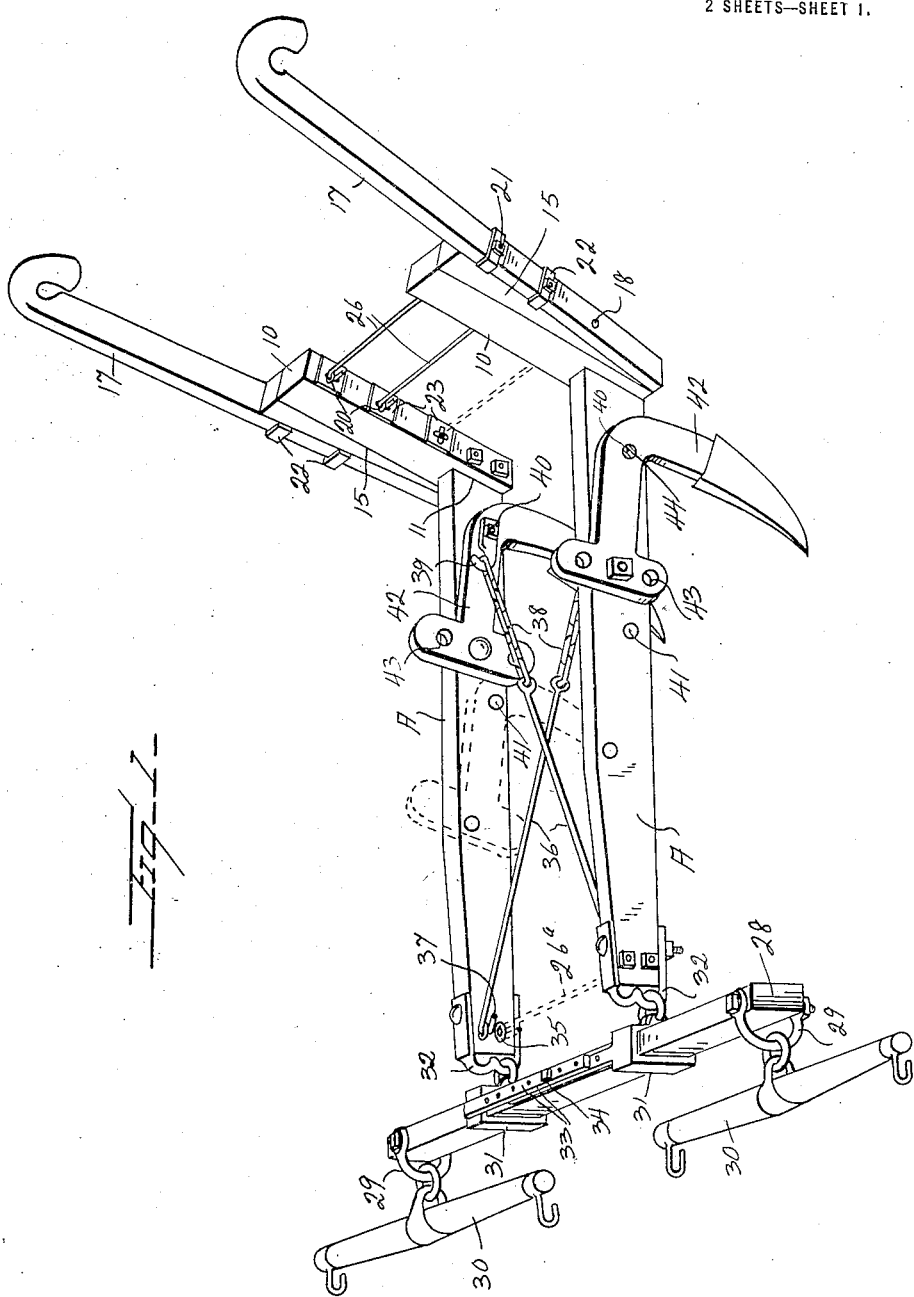
Inventor
G. R. Cook
By Watson E. Coleman
Attorney

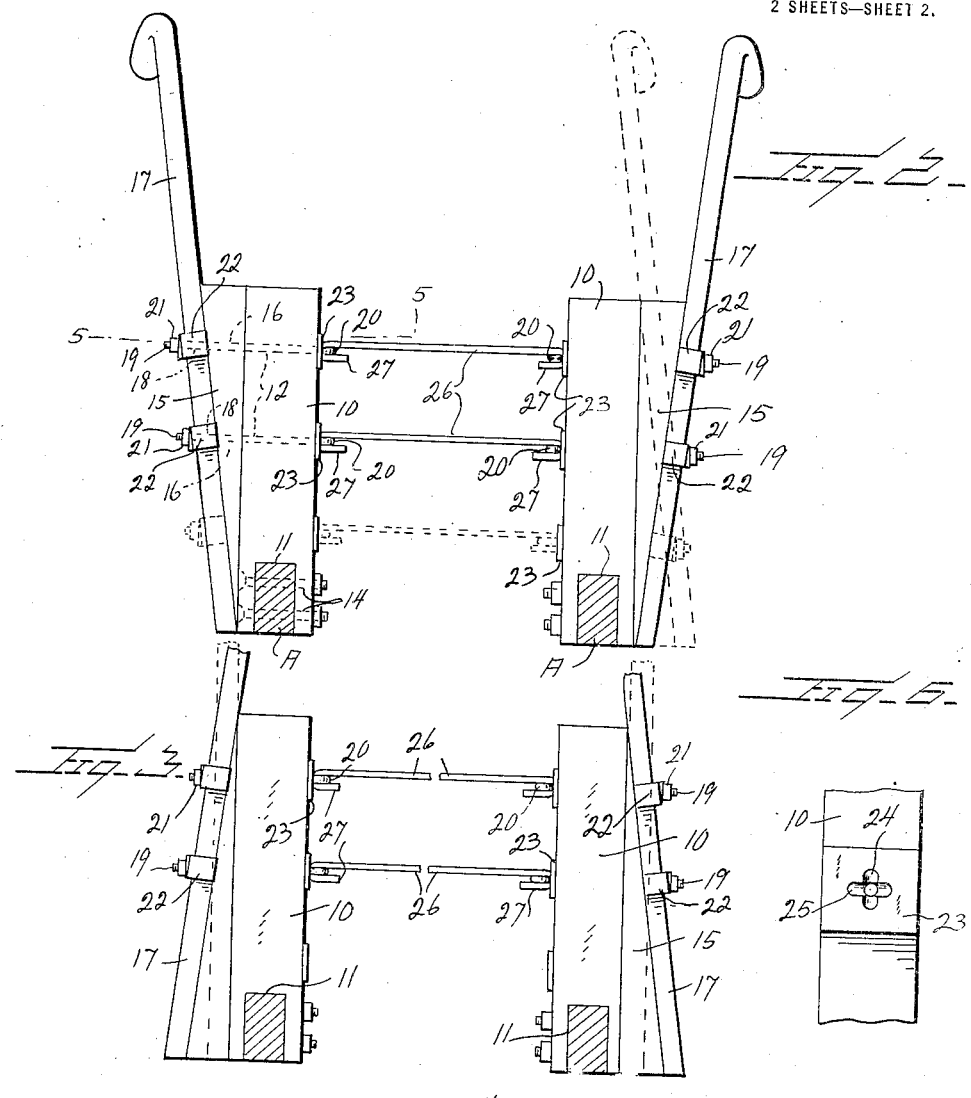

UNITED STATES PATENT OFFICE.

GORMAN R. COOK, OF ALPINE, ALABAMA.

PLOW AND CULTIVATOR CONVERTING ATTACHMENT.

1,348,782. Specification of Letters Patent. Patented Aug. 3, 1920.

Application filed October 27, 1919. Serial No. 333,451.

*To all whom it may concern:*

Be it known that I, GORMAN R. COOK, a citizen of the United States, residing at Alpine, in the county of Talladega and State of Alabama, have invented certain new and useful Improvements in Plow and Cultivator Converting Attachments, of which the following is a specification, reference being had to the accompanying drawings.

This invention relates to plows and like ground working implements, and particularly to means whereby two stock plows may be readily coupled together and used in such manner that one man with two horses may do the same work as two men.

The general object of the invention is to provide an attachment of this character which is very simple in construction and by which the two plows may be coupled or uncoupled to or from each other with a minimum of labor.

A further object is to provide an attachment of this character whereby a plurality of plows may be coupled to each other for the purpose of breaking land, laying off rows, double furrowing, listing, bedding or cultivating.

A further object is to provide an attachment of this character which will permit the plows to be adjusted nearer to or farther from each other, and which will permit the proper adjustment of the handles to bring them into proper position for a single operator to use and control the plows.

And another object is to so construct the attachment that the handles may be disposed in an upwardly convergent relation and an upwardly divergent relation, or parallel to each other.

Still another object is to provide a construction of this character whereby two plows may be coupled to each other so that the plows may be canted for plowing on hillsides, and whereby the handles may be tilted to tilt the points of each plow to thereby change the course of the plow without changing the plane upon which the plows are disposed, that is without raising one plow out of the ground.

A further object is to provide an attachment of this character which may be adjusted so that the plows will operate on each side of a row of plants and the connecting mechanism between the plows will straddle a row of plants.

Other objects have to do with the details of construction and the arrangement of parts as will appear more fully hereafter.

My invention is illustrated in the accompanying drawings, wherein:—

Figure 1 is a perspective view of a plow constructed in accordance with my invention;

Fig. 2 is a front elevation of the attachment standards and associated parts, the plow beams being in section;

Fig. 3 is a like view to Fig. 2 showing a different arrangement of the handles;

Fig. 4 is a fragmentary longitudinal sectional view of the double-tree partly broken away;

Fig. 5 is a section on the line 5—5 of Fig. 2;

Fig. 6 is a fragmentary edge view of one of the standards and the inside clamp plate 23.

In these drawings, A A designate two single plow beams with the regular handles removed. My device is for the purpose of coupling these plow beams to each other, holding them in proper spaced relation, and providing these coupled beams with proper handles in order to operate the double plow. To this end, I provide the upwardly extending posts or standards 10, each of which is recessed at its lower end, as at 11, and provided with a plurality of transversely extending passages 12, each passage preferably having therein a bushing 13. There are three of these transverse bolt passages 12 and there are a plurality of small bolt passages 14 formed in the lower end of the standard, whereby bolts may be extended through the lower end of the standard and through each plow beam A, as shown in Fig. 2.

Coacting with each standard 10 is an acutely triangular block 15 formed also with a plurality of passages 16 corresponding to both passages 12 of the standard 10, one face of this block being flat and the other disposed at an acute angle thereto. Coacting with each standard 10 and the triangular block 15 is a handle 17 which is perforated at a plurality of points, as at 18, these perforations corresponding to the passages 12 and the passages 16. Each standard 10 and the corresponding triangular block 15 and the corresponding handle 17 are adapted to be held in conjoined relation, as illustrated in Fig. 5, by means of bolts 19. Each of these bolts is formed at one end with an eye 20 and at its other end is screw-threaded for the reception of a nut 21, and at this end is provided with a U-shaped clamp 22 adapted to embrace either the standard 10 or the handle 17, as the case may be, the opposite end of each bolt 19 being provided with a clamping member 23, the face of which is formed with two intersecting depressions 24 and 25, the depression 24 extending vertically and the depression 25 extending horizontally. The depression 25 is designed to receive the eye of the bolt 19. Coacting with these eyebolts 19 are the transverse bracing rods 26 which are provided with hooks 27 at their ends adapted to engage in the eyes 20. If the eyes 20 extend horizontally and are disposed in the recess 25, then the hooks 27 will be disposed in a vertical plane and will extend into the depressions 24. It is to be understood that several sets of these tie rods 26 will go with each attachment, the tie rods being of different lengths for a purpose which will be later disclosed.

In attaching the members 10, 15 and 17 to the plow beams, the members 10 are, of course, bolted to the rear ends of the plow beams in the manner illustrated, and then the handles 17 may be bolted directly against the outer faces of the standards 10, in which case the handles will extend in vertical planes and parallel to each other, or the triangular spacing members 15 may be disposed on the outside faces of the standards and the handles be disposed upon the outside faces of these wedge-shaped members 15, as illustrated in Fig. 2. In this case, the handles will be upwardly divergent, or the triangular spacing members 15 may be disposed with their thin ends upward and the handles bolted thereon, in which case the handles will be upwardly convergent (see Fig. 3), or one of said triangular members may be disposed against the outside of the standard with its thin end upward, while the other member 15 is disposed with the thin end downward, in which case the handles will both be inclined in the same direction, as illustrated in dotted lines in Fig. 2. Thus, the handles may be adjusted to different distances from each other, or be adjusted as illustrated in dotted lines in Fig. 2 so that the handles are off-set with relation to the draft line of the mechanism so that the plows may operate on each side of a row while the plowman walks on one side of the row. The plows are intended to be spaced apart from each other different distances, and these distances will be regulated by the length of the braces 26 which are used for the purpose of spacing the plow beams from each other. Where relatively short braces 26 are used, the handles will have to be divergent, as in Fig. 2, as otherwise the handles of the plows would come too closely together to suit the convenience of the operator and give him too little control over the plows, whereas on the other hand, if the plow beams are spaced relatively far apart, the handles will have to be disposed in the upwardly convergent relation shown in Fig. 3 so as to bring them into convenient position for the operator.

It will be noted that the clamping plate 23 is so formed with the sockets 24 and 25 that the joint formed by the engagement of the hooked ends of rods 26 with the eyebolts 19 will not pinch or bind, but will work smoothly and evenly and will permit each plow beam to rise and fall independently of the other plow beam, the rods 26, however, bracing these plow beams from each other and holding them in proper spaced relation at all times. These rods 26 act as spacers for the plows.

It is to be noted that when the rods 26 are engaged with the eyebolts 19 and these rods 26 are in a horizontal position, that the hooks 26 cannot become disengaged from the eyes 20. If it be desired to disengage these spacing rods 26 or braces, then one plow must be raised relative to the other until the hooked ends of the rods 26 can become disengaged and vice versa when applying the rods 20. Both of the spacing rods are connected to the eyebolts 19 on one of the standards 10, and then the other plow beam is raised up until both hooks 27 slip into position in the corresponding eyebolt 19. Then the last named plow beam is lowered onto the ground and under these circumstances, as before stated, the hooks 27 cannot become disengaged from the eyebolts.

The forward ends of the beams A are held apart at a proper distance from each other by spacers or beam engaging members mounted upon a double-tree 28. This double-tree 28 is provided with clevises 29 pivoted on the ends of the double-tree and by which swingle-trees 30 are connected to the double-tree. Slidingly mounted upon the double-tree are the collars 31, each of these collars being so formed that it may be engaged by a clevis 32 of ordinary or usual form upon the forward end of the corresponding plow beam and these collars 31 or spacers are held in proper relation to each other by suitable means. As illustrated, each collar is provided with a longitudinally extending shank or rod 33 which is perforated equi-distantly with a plurality of holes, and the shank or rod 33 of one collar is adapted to overlie the shank or rod of the other collar. Thus, the collars may be adjusted longitudinally upon the double-tree and held in their longitudinally adjusted position by means of a pin 34 passing down through the registering perforations of the shank or rods 33 and into a perforation in the double-tree 28. These spacers may be so disposed that the plow beams will be held in parallel relation, or if desired the plow beams might be disposed in convergent relation or in divergent relation.

If, for instance, the plows are to be foot apart, the bolt 34 is loosened and the collars 31 or spacers are shifted toward each other on the double-tree until each collar is half a foot from the center. Then the bolt is put through the corresponding holes and tightened. The double-tree 28 is to be used only when plowing with plows 2½' apart or closer. When the plows are set farther apart than this, then the double-tree is removed entirely and the swingle-trees are hitched directly to each plow. The plows then are held at a uniform distance apart by having an additional spacing rod 26ª disposed between the forward ends of the beams and engaging with eyebolts 35 at the forward ends of the beams. Again, when the plows are to be used for plowing on each side of rows of large plants where this spacing member 26ª would be liable to knock down the plants, I use a small pole of a length equal to the distance the horses are to walk apart, one end of the pole being tied to the bridle bit of one horse, and the other to the bridle bit of the other horse. Then the spacing rod 26ª is removed and the lower spacing rod 26 connecting the standards 10 is raised so as to engage the second pair of eyebolts on the standards 10 instead of the lowermost pair, and thus the plows may be used for straddling plants which are waist high without hurting the plants.

In order to brace the plow beams from each other, I provide bracing rods 36 having hooks 37 at one end which engage in eyebolts on the forward ends of the plow beams. The rear end of each rod 36 is attached to a small length of chain 38. Hooks 39 are provided with which the links on the chain 38 may engage. These hooks are perforated for the passage of a bolt 40. The plow beams A are provided with perforations 41 for the passage of this bolt 40 and the shanks of the plows 42 may be provided with perforations for the passage of these bolts, which will also pass through the beams. These bracing rods 36 cross each other, as indicated in the drawings, and it is best to use braces where the land has stumps and roots, especially when the plows are being worked close together, or the braces may be used where plowing is being done with one plow foot in advance of the other, as illustrated in dotted lines in Fig. 1. The plow feet or blades 42 are of any suitable character, but are shown as provided with shanks having at their ends a plurality of perforations 43 whereby the plows may be adjusted and the shanks may be provided with a perforation 44 whereby the plow feet may be bolted to the beam and whereby the hook 39 may be bolted to the beam, as before explained. It is, of course, intended that the beams A be provided with suitable holes whereby either plow foot may be advanced or whereby both of the plow feet may be advanced or set back as desired.

My attachment permits two single plows to be combined to form a double plow, as heretofore described, and it will be noted that by using a relatively long, upper spacing rod 26 and a relatively shorter lower spacing rod 26 between the standards 10 that the standards may be caused to downwardly converge, thus downwardly converging the plow stocks, and that on the other hand, by using a relatively short upper bracing or spacing rod 26 and a relatively longer lower rod 26, that the standards may be caused to upwardly diverge. The handles, of course, may be adjusted under these circumstances, as before explained, so as to bring the handles in proper position for the plowman. In the first case, the plow feet are angled in at the bottom, or in the second case disposed in divergent relation to each other. The plows are held the same distance apart, whether the plow feet are disposed in a vertical position or in an inclined position, and in either case all of the plows rest on the ground at the same time. By means of the double-tree with swingle-trees connected to the ends of the double-tree, the plows pull evenly at all times, whether one horse walks ahead of the other or not, as if one horse walks ahead of the other, the greater portion of the draft will be on this horse, which will naturally cause him to fall back until both horses pull evenly.

One of the main advantages of my construction is that the two plows or beams are not connected rigidly to each other, except in so far as they are spaced a proper distance from each other, but that if the handles of the plows are tilted so as to cause the plows to move on a curve or on a hillside, all the plows will take the ground uniformly. Furthermore, in order to change the course of the plow, it is only necessary to tilt the handles. Under these circumstances, the points of both plows take the same angle and stay on the same plane of level. If a cultivator of the rigid type is tilted by means of the handles, one of the plows will be raised out of the ground and, therefore, in order to change the course of a cultivator having rigid plows running in parallel relation, he must force the plow out of its course by main force.

It will be seen that it is a very easy matter for the user to use a single plow or a double plow and to adjust these double plows into different relations to each other to conform to the character of the work to be done. All of the parts are very simple and may be cheaply made, and the adjustments of these plows are extremely simple.

While I have illustrated a construction which I believe to be particularly effective for the purpose intended, I do not wish to be limited to this, as it is obvious that many changes might be made in the details of construction and arrangement of parts without departing from the spirit of the invention.

I claim:—

1. A plow attachment including a pair of standards adapted to be engaged with the rear ends of a pair of plow beams, handles coacting with the standards, means connecting the standards and adapted to hold them in parallel, upwardly convergent or downwardly convergent relation, and means whereby the handles may be disposed and held in an upwardly convergent, upwardly divergent, or parallel relation to said standards.

2. A plow attachment including a pair of standards adapted for engagement with the rear ends of a pair of plow beams, means holding said standards in spaced relation to each other, handles carried by the standards, and means whereby the handles may be disposed in upwardly convergent, upwardly divergent, or parallel relation to each other.

3. A plow attachment including a pair of standards adapted for engagement with the rear ends of a pair of plow beams, spacing members adapted to be disposed against the outer faces of said standards, handles coacting with the standards, bolts passing through the standards, through said spacing members and the handles and holding the handles and spacing members in detachable engagement with the standards, each of said bolts having an eye on its inner end, and rods having hooked ends adapted to be engaged in said eyes to thereby hold the standards in spaced relation to each other.

4. A plow attachment including a pair of standards adapted for engagement with the rear ends of a pair of plow beams, means operatively engaging the standards and holding them in spaced relation, wedge-shaped blocks adapted to be disposed against the face of the standards with their butt ends upward or downward, and handles adapted to be engaged against the outer faces of said blocks whereby the handles may be disposed in convergent, divergent, or parallel relation to the standards.

5. A plow attachment including a pair of standards adapted to engage the rear ends of a pair of plow beams, wedge-shaped blocks adapted to be disposed against the side faces of the standards, handles adapted to be disposed against the side faces of the blocks, bolts passing through each standard and corresponding block and corresponding handle and being provided with eyes on their inner ends, and spacing members disposed between the standards and operatively engaged therewith to hold the standards in spaced relation.

6. A plow attachment including a pair of standards adapted to engage the rear ends of a pair of plow beams, wedge-shaped blocks adapted to be disposed against the side faces of the standards, handles adapted to be disposed against the side faces of the blocks, bolts passing through each standard and corresponding block and corresponding handle and being provided with eyes on their inner ends, and spacing members disposed between the standards and operatively engaged therewith to hold the standards in spaced relation, said spacing members being so connected to the bolts as to permit the rotation of one plow beam with relation to the other plow beam.

7. The combination with a pair of plow beams and plows carried thereby, of a pair of standards detachably engaged with the rear ends of the plow beams, spacing members swingingly engaged with said standards and holding them in spaced relation but permitting one plow beam, its plow, and the corresponding standard to be raised or lowered with reference to the other plow beam and corresponding standard, handles carried by the standards, means engaging the forward ends of the beams and holding them in spaced relation but permitting the plow beams to be raised or lowered with reference to each other, and braces attached each to the forward end of one of said beams and extending diagonally rearward to the other end and being detachably engaged therewith.

8. The combination with a pair of plow beams having plows thereon, of handles detachably engaged with the rear ends of the plow beams and extending upward therefrom, means operatively engaging said handles to hold the rear ends of the plow beams apart and in spaced relation to each other, draft applying means engaging the forward ends of the plow beams and permitting the forward ends of the plow beams to be adjusted nearer to or farther from each other, crossed bracing rods disposed between the plow beams, the forward ends of the bracing rods being detachably engaged with the forward ends of the plow beams, chains extending from the rear ends of the bracing rods, hooks having a perforated shank engaged with said chains, and bolts for each hook, the plow beams being perforated for the passage of said bolts.

9. The combination with a pair of plow beams and means whereby the rear ends of the plow beams may be held in different spaced relations, of a double-tree, means for engaging the double-tree with the plow beams comprising collars slidable upon the double-tree and with which the forward ends of the beams are engaged, each of said collars having a longitudinally extending shank perforated at intervals, the shanks adapted to overlie each other, and a bolt passing through the shanks and through the double-tree.

10. A plow attachment including a pair of standards, each standard being recessed at its lower end to engage over and embrace the rear end of a plow beam, bolts passing through said recessed portions of the standards and adapted to pass through the plow beam, spacing members detachably engaged with the standards to hold said standards in spaced relation to each other, and handles mounted upon said standards, said handles being adjustable into parallel relation to each other or into an upwardly divergent or convergent relation.

11. A plow attachment including a pair of standards adapted to be detachably engaged with the rear ends of a pair of plow beams, handles disposed against the faces of the standards, eyebolts passing through said standards, and handles having eyes at their inner ends, a clamping plate disposed between each eye and the corresponding standard and formed with a horizontally extending depression and a vertically extending depression, and spacing members having hooks at their ends adapted to be engaged with said eyes, the cruciform depressions in the clamping plates receiving respectively the eyes on the eyebolts and the hooks of said spacing members.

In testimony whereof I hereunto affix my signature.

GORMAN R. COOK.